United States Patent
Becker et al.

(10) Patent No.: US 9,078,470 B2
(45) Date of Patent: Jul. 14, 2015

(54) MENTHOL CIGARETTE

(75) Inventors: Ulrike Becker, Richmond, VA (US); Tony Howell, Midlothian, VA (US); Lixin Xue, Midlothian, VA (US); Georgios D. Karles, Richmond, VA (US); Jay A Fournier, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 790 days.

(21) Appl. No.: 13/422,654

(22) Filed: Mar. 16, 2012

(65) Prior Publication Data
US 2012/0167905 A1 Jul. 5, 2012

Related U.S. Application Data

(62) Division of application No. 11/526,813, filed on Sep. 26, 2006, now Pat. No. 8,157,918.

(60) Provisional application No. 60/722,033, filed on Sep. 30, 2005.

(51) Int. Cl.
| A24B 15/30 | (2006.01) |
| A24D 1/00 | (2006.01) |
| A23L 1/22 | (2006.01) |
| A24B 15/28 | (2006.01) |
| A24C 5/60 | (2006.01) |
| A24D 1/02 | (2006.01) |
| A24D 3/14 | (2006.01) |
| A24D 3/16 | (2006.01) |

(52) U.S. Cl.
CPC .............. *A24D 1/002* (2013.01); *A23L 1/22025* (2013.01); *A23L 1/22041* (2013.01); *A24B 15/282* (2013.01); *A24B 15/283* (2013.01); *A24C 5/608* (2013.01); *A24D 1/02* (2013.01); *A24D 1/025* (2013.01); *A24D 3/14* (2013.01); *A24D 3/16* (2013.01)

(58) Field of Classification Search
None
See application file for complete search history.

(56) References Cited

U.S. PATENT DOCUMENTS

| 3,166,078 A | 1/1965 | Parmele et al. |
| 3,236,244 A | 2/1966 | Irby, Jr. et al. |
| 3,340,879 A | 9/1967 | Horsewell et al. |

(Continued)

FOREIGN PATENT DOCUMENTS

| EP | 1754419 A1 | 2/2007 |
| WO | WO 2004/047572 A1 | 6/2004 |

OTHER PUBLICATIONS

International Search Report and Written Opinion mailed Jun. 28, 2007 for PCT/IB2006/003867.

(Continued)

*Primary Examiner* — Richard Crispino
*Assistant Examiner* — Phu Nguyen
(74) *Attorney, Agent, or Firm* — Buchanan Ingersoll & Rooney PC

(57) ABSTRACT

Cigarettes are provided which contain a filtering system and flavorants encapsulated with polyvinyl acetate, wherein deactivation of a sorbent by the flavorant is reduced through the encapsulation of the flavorant within the polyvinyl acetate. A preferred flavorant is menthol. The encapsulated flavorants are prepared by mixing at least one flavorant with polyvinyl acetate and a solvent, such as ethanol, and forming the encapsulated flavorants. Methods of making cigarettes and smoking the articles are also provided.

8 Claims, 9 Drawing Sheets

(56) References Cited

U.S. PATENT DOCUMENTS

| | | |
|---|---|---|
| 3,390,686 A | 7/1968 | Irby, Jr. et al. |
| 3,390,688 A | 7/1968 | Touey et al. |
| 3,460,543 A | 8/1969 | Keith, II et al. |
| 3,527,235 A | 9/1970 | Fidelman |
| 3,603,319 A | 9/1971 | Badgett et al. |
| 4,318,417 A | 3/1982 | Hiroshi et al. |
| 4,409,995 A | 10/1983 | Nichols |
| 4,677,995 A | 7/1987 | Kallianos et al. |
| 4,687,008 A | 8/1987 | Houck, Jr. et al. |
| 4,715,390 A | 12/1987 | Nichols et al. |
| 4,729,391 A | 3/1988 | Woods et al. |
| 4,785,833 A | 11/1988 | Holzner et al. |
| 4,816,265 A | 3/1989 | Cherukuri et al. |
| 4,889,144 A | 12/1989 | Tateno et al. |
| 4,931,293 A | 6/1990 | Cherukuri et al. |
| 4,936,920 A | 6/1990 | Keritsis et al. |
| 4,941,486 A | 7/1990 | Dube et al. |
| 4,981,882 A | 1/1991 | Smith et al. |
| 5,000,965 A | 3/1991 | Killeen et al. |
| 5,012,829 A | 5/1991 | Thesing et al. |
| 5,057,328 A | 10/1991 | Cherukuri et al. |
| 5,060,675 A | 10/1991 | Milford et al. |
| 5,103,844 A | 4/1992 | Hayden et al. |
| 5,105,834 A | 4/1992 | Saintsing et al. |
| 5,105,838 A | 4/1992 | White et al. |
| 5,109,876 A | 5/1992 | Hayden et al. |
| 5,137,034 A | 8/1992 | Perfetti et al. |
| 5,137,036 A | 8/1992 | Southwick |
| 5,144,966 A | 9/1992 | Washington |
| 5,221,502 A | 6/1993 | Washington |
| 5,228,461 A | 7/1993 | Chan et al. |
| 5,229,148 A | 7/1993 | Copper |
| 5,301,693 A | 4/1994 | Chan et al. |
| 5,479,949 A | 1/1996 | Battard et al. |
| 5,568,819 A | 10/1996 | Gentry et al. |
| 5,588,446 A | 12/1996 | Clearman |
| 5,911,224 A | 6/1999 | Berger |
| 5,911,980 A | 6/1999 | Samour et al. |
| 6,194,019 B1 | 2/2001 | Anderson |
| 6,470,894 B2 | 10/2002 | Hersh et al. |
| 6,584,979 B2 | 7/2003 | Xue et al. |
| 6,761,174 B2 | 7/2004 | Jupe et al. |
| 6,772,768 B2 | 8/2004 | Xue et al. |
| 6,779,528 B2 | 8/2004 | Xue et al. |
| 7,067,152 B2 | 6/2006 | Shefer et al. |

OTHER PUBLICATIONS

International Preliminary Report on Patentability mailed Apr. 10, 2008 for PCT/IB2006/003857.

MENTHOL CIGARETTE

This application is a divisional of U.S. patent application Ser. No. 11/526,813, entitled MENTHOL CIGARETTE, filed on Sep. 26, 2006 now U.S. Pat. No. 8,157,918, which claims priority to U.S. Provisional Application Ser. No. 60/722,033, filed Sep. 30, 2005, the entire content of each is hereby incorporated by reference.

BACKGROUND

Flavorants are frequently added to tobacco products to achieve desirable organoleptic sensations. One of the common flavorants is menthol. Menthol is a volatile compound and tends to vaporize (volatilize) and gradually escape from the tobacco product during storage.

Various sorbent materials have been employed as additives in tobacco products to remove selected constituents of tobacco smoke. The more common additives include activated carbons, molecular sieves, zeolites and mixtures thereof.

Activated carbons are useful sorbent materials and have a large absorbent capacity. However, while activated carbons are effective in removing targeted constituents from tobacco smoke, they lack selectivity and also absorb volatile flavorants such as menthol when present in tobacco products.

Accordingly, there is interest in providing flavorants such as menthol in tobacco products containing sorbent materials such as activated carbons, molecular sieves, and zeolites, in a form which protects the flavorants from volatilization, deterioration and absorption by the sorbent material while enabling the flavorant to be gradually released when the tobacco products are smoked.

SUMMARY

A cigarette is provided which contains a flavorant encapsulated with polyvinyl acetate, where heat and/or moisture are used to release the flavorant from the polyvinyl acetate encapsulation into mainstream smoke during smoking. Also provided is a method of improving taste attributes of cigarettes containing sorbent, such as activated carbon, by using flavorant with reduced deactivation of the sorbent.

Also provided is a filter cigarette comprising a substantially cylindrical tobacco rod, a substantially cylindrical filter rod and a tipping paper circumscribing and joining the filter rod and the tobacco rod wherein the filter rod includes a flavorant encapsulated by polyvinyl acetate; a method of making a cigarette; and a method of treating mainstream tobacco smoke.

In one embodiment, a cigarette comprising tobacco, a filter, sorbent, and an encapsulated flavorant comprising a polyvinyl acetate matrix with menthol flavorant bound within the matrix is provided.

A further embodiment provides a method of making a cigarette including a sorbent in a filter thereof, comprising: incorporating an encapsulated flavorant comprising a polyvinyl acetate matrix with menthol flavorant bound within the matrix in a component of the cigarette.

In yet another embodiment, a method of flavoring mainstream tobacco smoke, comprising: retaining a flavorant (menthol) with a polyvinyl acetate matrix and releasing menthol from the matrix while generating mainstream smoke, said releasing step including an application of heat and/or moisture to the matrix is provided.

DETAILED DESCRIPTION

Figure 1A:
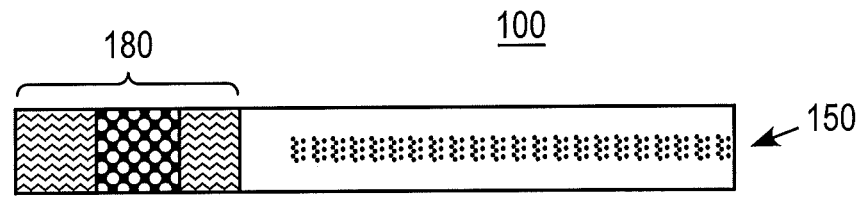
FIGS. 1(a)-(c) illustrate exemplary embodiment encapsulated products in a tobacco rod.

Cigarettes are described which contain flavorants encapsulated with polyvinyl acetate and a filtering system comprising at least one sorbent. Methods of making encapsulated flavorants, methods of manufacturing cigarettes and methods of treating smoke from these articles are also described.

The term "smoking article" includes cigarettes, pipes, cigars, cigarillos and the like.

The term "mainstream smoke" includes aerosol drawn through a smoking article to the mouth end of the smoking article.

The term "encapsulation" includes both encapsulation and microencapsulation of one material by another material, wherein microencapsulation includes encapsulation on a micro-capsule size, i.e., between less than 1 µm to over 2000 µm. For example, as used herein, encapsulation preferably includes forming a matrix of one material wherein a second material is microencapsulated within the matrix of the first material. Likewise, "encapsulated flavorants" refers to flavorants which are encapsulated or microencapsulated, preferably with flavorants in a polyvinyl acetate encapsulant matrix.

Any number of flavorants are suitable for encapsulation with polyvinyl acetate. Menthol is the preferred flavorant. Other suitable flavorants include mint, such as peppermint and spearmint, vanillin, chocolate, licorice, citrus and other fruit flavors, spice flavors, such as cinnamon, methyl salicylate, linalool, bergamot oil, geranium oil, lemon oil, ginger oil, tobacco flavors and other agents commonly used to impart flavor and aroma to the mainstream smoke of tobacco products. Flavorants suitable for encapsulation are also discussed in commonly assigned U.S. Pat. Nos. 5,301,693, 5,228,461, and 5,137,036, which are hereby incorporated by reference in their entireties.

In accordance with one embodiment, one or more encapsulated flavorants are incorporated in a filter of a cigarette wherein the filter employed in the cigarette includes at least one sorbent (absorbent or adsorbent). The term "sorbent" as used herein refers to an adsorbent, an absorbent, or a substance that can function as both an adsorbent and an absorbent. The term "sorption" is intended to encompass interactions on the outer surface of sorbents such as activated carbon, molecular sieves, zeolite and other like materials, as well as interactions within the pores and channels thereof.

Preferable sorbents include various forms of activated carbon, molecular sieves, such as zeolites, and mixtures thereof. Activated forms of carbon have strong physical adsorption forces, and high volumes of adsorbing porosity. The activated carbon could be manufactured by any suitable technique. One technique is the carbonization of coconut husk, coal, wood, pitch, cellulose fibers, or polymer fibers, for example. Carbonization is preferably carried out at high temperatures, i.e., 200-800° C. in an inert atmosphere, followed by activation under oxidizing conditions. The activated carbon used in the cigarettes could be in the form of monolithic shapes, granules, beads, powders or fibers. If desired, the activated carbon can be incorporated in another material such as paper.

Activated carbon may include a distribution of micropores, mesopores and macropores. The term "microporous" generally refers to such materials having pore sizes of about 20 Å or less while the term "mesoporous" generally refers to such materials with pore sizes of about 20 to 500 Å. The term "macroporous" refers to pore sizes above 500 Å. The relative amounts of micropores, mesopores and macropores can be pre-selected relative to the selected constituents from mainstream tobacco smoke that are to be targeted and removed. Thus, the pore sizes and pore distribution can be adjusted accordingly as needed for a certain application.

Another material which may be used as a sorbent in the filter system of the cigarette is a molecular sieve zeolite. The term "molecular sieve" as used herein refers to a porous structure composed of an inorganic silicate material. Zeolites have channels or pores of uniform, molecular sized dimensions. There are many known unique zeolite structures having different sized and shaped channels or pores. The size and shape of the channels or pores can significantly affect the properties of these materials with regard to adsorption and separation characteristics. Zeolites can be used to separate molecules in the channels or pores, and/or by differences in strength of sorption. By using one or more zeolites having channels or pores larger than selected constituents of mainstream smoke, only selected molecules that are small enough to pass through the pores of the molecular sieve material are able to enter the cavities and become sorbed by the zeolite.

Microporous, mesoporous and/or macroporous molecular sieves may be used as the sorbent. They are selected for use in a filter system based on the particular constituent(s) to be removed from the mainstream smoke. Zeolite-type molecular sieves which are useful in the cigarettes include crystalline aluminosilicates, silicoaluminophosphates (AlPO/SAPO) and mesoporous molecular sieves such as MCM-41, MCM-48 and SBA-15. These are preferably granular materials. This family of materials contains regular arrays of uniformly-sized channels and tunable internal active sites, and admits molecules below a certain size into their internal space which makes them useful as catalysts and absorbents where selectivity is desired.

The sorbent can be incorporated in one or more locations of the cigarette. For example, the sorbent can be placed in the passageway of a tubular free-flow filter component, in the material of a filter component, and/or in a void space of a filter. The sorbent can additionally or alternatively be incorporated in a tobacco material or wrapper of a cigarette.

The filter may comprise a sorbent in oriented or non-oriented fibers and a sleeve, such as paper, surrounding the fibers. The sorbent can be, for example, one or more of activated carbon, zeolite, and other molecular sieves located in fibrous forms. Sorbent mixtures can provide different filtration characteristics to achieve a targeted filtered mainstream smoke composition.

Alternatively, the sorbent can be composed of one or more sorbent materials, such as carbon, silica, zeolite and the like, impregnated in micro-cavity fibers, such as TRIAD™ micro-cavity fiber available from Honeywell International of Morristown, N.J. The fibers may be shaped micro-cavity fibers impregnated with particles of one or more sorbent materials. See commonly assigned U.S. Pat. Nos. 6,584,979, 6,772,768 and 6,779,528 which are hereby incorporated by reference in their entirety.

In another embodiment, the fibers may be bundles of non-continuous fibers, which are preferably oriented in the filter along the direction of mainstream smoke flow through a cigarette.

Sorbent containing filter rods can be formed, for example, by stretching a bundle of non-crimped sorbent fiber material, preferably having a controlled total and per filament denier, through a pre-formed or in-situ formed sleeve during the filter making process. The formed filter rod can be separated into filter plugs by cutting to a desired length. For example, the filter plugs can have a length of from about 5 mm to about 30 mm.

Sorbent can be incorporated in a cigarette filter at one or more desired locations. In a preferred embodiment, a sorbent segment is combined with a free-flow filter. The sorbent can be in contact with (i.e., abut) a free-flow filter positioned between the free-flow filter and a mouthpiece filter plug or in contact with (i.e., abut) a mouthpiece filter plug. The sorbent segment preferably has a diameter substantially equal to that of the outer diameter of a free-flow filter to minimize by-pass of smoke during the filtration process.

Fibrous sorbent containing filter segments preferably have a high loft with a suitable packing density and fiber length such that parallel pathways are created between fibers. Such structure can effectively remove selected gas-phase constituents, such as formaldehyde and/or acrolein, while preferably removing only a minimal amount of particulate matter from the smoke, thereby achieving a significant reduction of the selected gas-phase constituents, while not significantly affecting the total particulate matter (TPM) in the tobacco smoke. A low packing density and a short fiber length are preferred to achieve such filtration performance.

The amount of sorbent used in preferred embodiments of the cigarette depends on the type of gas-phase constituents in the tobacco smoke and the type of constituents that is desired to be removed from the tobacco smoke.

When sorbents and flavorants are used in cigarettes, flavorants can deactivate sorbents when the flavorants are sorbed by the sorbents. Thus, to reduce the level of deactivation of sorbent, flavorants are preferably protected from sorption by the sorbent by encapsulation. Through encapsulation, the interaction between the sorbent and flavorant, as well as the resulting sorption of the flavorant can thereby be reduced.

The encapsulated flavorant can be located at various parts of the cigarette to provide flavorant in the cigarette and reduce deactivation of sorbents. In one embodiment, the encapsulated flavorant may be in the form of beads located in tobacco filler. By using beads, a controlled release of the flavorant in the cigarette during puff cycles can be achieved. The beads preferably comprise polyvinyl acetate encapsulating at least one flavorant, wherein heat and/or moisture supplied to the encapsulated flavorant during the smoking of the cigarette release the flavorant from the encapsulant. Other materials to improve characteristics of the encapsulating material or enhance its stability can optionally be added, such as filler.

In an exemplary embodiment, beads of encapsulated additive can be provided which have a substantially homogenous composition in which flavorant is substantially uniformly distributed through the beads. By such structure, the flavoring can be released from the beads in a uniform manner during smoking.

Also, by encapsulating the flavorant, the encapsulated flavorant is protected from exposure to the atmosphere (i.e., ambient air, inside a package) and sorbents in a cigarette such as a cigarette. Thus, release and/or migration of the flavorant are minimal until the encapsulated flavorant is exposed to increased moisture or heat. While not wishing to be bound by theory, it is believed that increased moisture, as well as increased temperature causes the polyvinyl acetate matrix encapsulating the flavorant to expand the polyvinyl acetate matrix, thus creating pathways out from the polyvinyl acetate matrix and allowing for flavorant to escape.

For example, the polyvinyl acetate matrix encapsulated flavorant can be applied to a filter of a cigarette, wherein moisture and heat from contact with a user's mouth can release the flavorant. As another example, temperatures between 50° C. and 900° C., or between 100° C. and 800° C. (e.g., above 25, 50, 100, 200, 300, 400, 500, 600, 700, 800° C.) can be applied to an encapsulated flavorant to expand an encapsulating polyvinyl acetate matrix, which in turn can cause release of flavorant from the encapsulating polyvinyl acetate matrix.

Consequently, unintentional release of the flavorant or interaction between the flavorant and sorbent can be reduced by encapsulating the flavorants. Also intentional release of the flavorant can be achieved through elevated moisture levels or elevated temperatures, which are available in a smoked cigarette. Therefore encapsulating flavorant within a polyvinyl acetate matrix allows for improved flavorant delivery during increased temperature and/or moisture levels, especially in sorbent containing cigarettes.

The encapsulated flavorant can have any desired shape, including regular or irregular shapes, including round, square, rectangular, oval, other polygonal shapes, cylindrical, fibrous, and the like. Beads can have various sizes. Preferably, the beads are microbeads having a maximum particle size of less than about 25 µm, and more preferably less than about 1 µm. Decreasing the size of the beads can provide a more homogenous and controlled release of flavoring by providing increased surface area of the beads.

The encapsulated products can be manufactured by any suitable process that produces articles having the desired structure, composition, and size. For example, the encapsulated products can be manufactured by extrusion, spray drying, coating, or other suitable processes. In a preferred embodiment, the encapsulated products are prepared by forming a solution, dispersion or emulsion containing polyvinyl acetate, flavoring and optional flavorants and drying to obtain a shaped encapsulant.

While not wishing to be bound by theory, it is believed that encapsulation of the flavorant by the polyvinyl acetate is based on the principle of surface segregation. It is believed that the polyvinyl acetate forms a matrix with a surface portion of the encapsulated flavorant including a higher ratio of polyvinyl acetate to encapsulant than an inner portion where the polyvinyl acetate is segregated toward the surface and the flavorant is segregated away from the surface.

The encapsulated flavorants are preferably prepared by mixing one or more flavorants in powder or liquid form, a volatile solvent and polyvinyl acetate, then drying the resultant solution to remove the solvent and bind the flavorant to within a matrix formed by the polyvinyl acetate. The product recovered is a flavorant encapsulated by the polyvinyl acetate matrix to retain the flavorant and bind the flavorant within the matrix. The encapsulated product can be in the form of a fiber, film, monolith, bead, powder or granule.

Preferred solvents include methanol or ethanol. The solvent is preferably sufficiently volatile to be entirely removed in the product leaving polyvinyl acetate and flavorant alone. However, the solvent may remain if desired.

The proportions of the components can be widely varied. The amount of flavorant, such as menthol, can be from about 1-90%, about 2-70% or about 10-50% by weight based on 100 parts by weight of the polyvinyl acetate. The amount of solvent is preferably sufficient to solubilize the flavorant and polyvinyl acetate.

Preferably, a composite of flavorant and polyvinyl acetate is formed by compounding, blending and/or dissolution of the flavorant and the polyvinyl acetate in solvent. Preferably, heat and mechanical shearing are used to mix the flavorant and polyvinyl acetate.

Also preferably, one or more flavorants are dissolved and/or entrapped as a separated phase in a continuous matrix of the polyvinyl acetate. Thus, the composite would be a matrix of polyvinyl acetate with flavorant within the matrix. Therefore, upon exposure to heat and/or moisture, barrier properties of the polyvinyl acetate can be reduced by a relaxation of the polyvinyl acetate matrix caused by the increase in temperature and/or moisture levels, thus allowing for the flavorant to be released from the matrix.

For example, a process for preparing menthol/polyvinyl acetate composites can include mixing a solvent, such as alcohol, for example ethanol, and polyvinyl acetate to form a solution. Next, a menthol flavorant can be added to the ethanol and polyvinyl acetate solution to provide flavoring. Next, the ethanol solvent content can be reduced to increase the concentration levels of menthol and polyvinyl acetate in the solution. It is noted that while menthol is volatile and can evaporate, the mixture of the menthol with the polyvinyl acetate in this example reduces menthol evaporation due to the menthol being dispersed within the polyvinyl acetate, wherein the dispersion reduces the menthol evaporation rate. Next, the mixture can be formed into desired shapes, such as fibers, films, monoliths, beads, powders, and granules, wherein the solvent can be vaporized to form a final composite material with the menthol encapsulated within a matrix of polyvinyl acetate. Reducing the solvent content is optional and can provide increased flavor content in the final composite material.

It is also noted that the relative amounts of menthol in polyvinyl acetate provides for variations in final flavorant levels. For example, if approximately 37% menthol is provided, approximately 35% menthol can be expected to be released upon use. On the other hand, a level of menthol in the mixture can exceed base encapsulation levels for these exemplary methods of encapsulation and alternative encapsulation techniques can be used.

An example of menthol levels exceeding base encapsulation levels for these exemplary methods of encapsulation is if the starting amount of menthol in the mixture is higher than, for example, approximately 70%. At this level, the amount of menthol for encapsulation is believed to exceed the base encapsulation levels, as only about 23% of the menthol was found to be encapsulated for this example. While not wishing to be bound by theory, the menthol appears to agglomerate at higher levels, such as 70% for this exemplary method, and the menthol does not appear to disperse in the polyvinyl acetate matrix above a certain menthol level, in this example at levels around 70%, thus reducing menthol encapsulation levels.

However, it is noted that another exemplary method can be used to encapsulate higher menthol levels. For example, if the mixture with the high menthol starting level of 70%, as mentioned above, is aged by holding the menthol and polyvinyl acetate in solution for an extended period of time, improved flavorant encapsulation and eventual release upon use can be observed. For example, if a mixture of 70% menthol, solvent and polyvinyl acetate is aged for approximately three months, a composite material, which is formed from the aged solution, can show improved menthol retention and encapsulation with an eventual release level during smoking of up to 70% menthol. Therefore, by aging highly concentrated menthol/polyvinyl acetate mixtures, menthol levels of up to 70% can be achieved for release.

Alternatively, rather than aging, it is noted that similar results for encapsulating higher levels of menthol can be achieved by reducing the solvent content of a solution of menthol, solvent and polyvinyl acetate. For example, the solvent in the solution can be evaporated away to reduce solvent content. By reducing solvent content similarly high menthol levels encapsulated appear to be at encapsulation levels similar to that of menthol subjected to aging. For example, a solution with reduced solvent content and high levels of menthol, such as 55% menthol, can be encapsulated by polyvinyl acetate and can lead to menthol levels of about 55% encapsulation.

It can be seen that flavorants can be encapsulated and provided in various physical forms which are stabilized and thus not subject to loss through volatilization, deterioration and/or sorption by activated carbon, zeolites or other sorbents present in the cigarette. Preferably, the encapsulated flavorant contains flavorant, polyvinyl acetate and optional flavorants with no other materials present.

The cigarette preferably comprises an amount of the encapsulated flavorant that provides a desired amount of the flavoring in the cigarette. In a preferred embodiment, the cigarette comprises, based on the total weight of tobacco in the cigarette, up to about 20%, and more preferably about 10% to about 15%, of the encapsulated flavorant. For example, a cigarette containing 100 mg of tobacco preferably contains up to about 20 mg of encapsulated flavorant.

In a preferred embodiment, the encapsulated flavorant is disposed in at least one location in a cigarette that reaches at least a minimum temperature at which the flavoring is released from a polyvinyl acetate encapsulant during smoking. For example, the encapsulated flavorant can be disposed in the tobacco or on a wrapper for burning, wherein a combination of heat and moisture can be used to release the flavorant from the polyvinyl acetate encapsulant.

In another preferred embodiment, the encapsulated flavorant is disposed in at least one location in a cigarette that is subjected to increased moisture during smoking wherein moisture from mainstream smoke or from a smoker's mouth can be used as the release mechanism for the flavorant. For example, the encapsulated flavorant can be disposed in a void downstream from a sorbent in a filter or on one or more surfaces of a free flow filter, wherein moisture from the mainstream smoke can release the flavorant from the encapsulant.

In another preferred embodiment, encapsulated flavorant is disposed in tobacco rods by injecting the encapsulated flavorant in liquid form into tobacco rods. For example, the encapsulated flavorant can be formed as liquids, such as hot melt or solvent based liquids, of the encapsulated flavorants for injection. Preferably, a liquid injection can be applied to a center of a tobacco rod of a cigarette to wet the tobacco or fill a center portion of the tobacco rod to provide encapsulated flavorant into a tobacco rod. However, the injection can be at any position within the tobacco rod. For example, see FIG. 1(a) which illustrates a preferred embodiment tobacco rod 100 with encapsulated flavorants 150 injected in liquid form in a center portion of the tobacco rod 100 upstream from a filter 180.

Figure 1B:
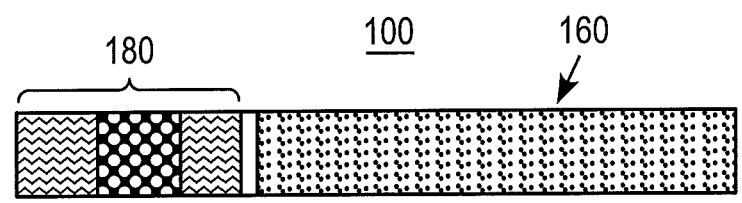

In another preferred embodiment, the liquid encapsulated flavorant is disposed in tobacco filler by spraying or coating the encapsulated flavorant in liquid form onto the tobacco filler. For example, the encapsulated flavorant can be formed as hot melt or solvent based solutions (e.g., ethanol, polyvinyl acetate and menthol) of the encapsulated flavorants, as mentioned above, but in this embodiment, the liquid encapsulated flavorant is sprayed or coated on the tobacco filler. Preferably for cigarettes, the sprayed or coated encapsulated flavorants are applied uniformly to the tobacco filler prior to forming tobacco rods 100 in order to provide the encapsulated flavorant 160 throughout the tobacco rod 100, as illustrated in FIG. 1(b).

Figure 1C:
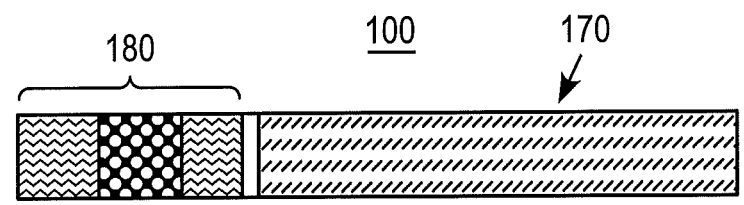

In another preferred embodiment, solid encapsulated flavorant is disposed in tobacco filler by mixing solid encapsulated flavorant into the tobacco filler. Preferably, to increase the miscibility of the solid encapsulated flavorant, the solid encapsulated flavorant to be mixed is shredded, ground or otherwise mechanically processed into shredded film, ground powder, or otherwise smaller sized particles to increase the miscibility of the encapsulated flavorant into the filler. Preferably, the encapsulated flavorant 170 is mixed with the tobacco filler prior to or during the rod-making process thus allowing the encapsulated flavorant 170 to be distributed throughout the tobacco rod 100, as illustrated in FIG. 1(c).

In another embodiment, the encapsulated flavorant can be present as a film. The film can be provided by applying and drying a film forming material with the flavorant therein, wherein the flavorant can be provided as pre-encapsulated flavorant or non-encapsulated flavorant mixed within the film forming material. Preferably, the film forming material comprises polyvinyl acetate film. Also preferably, the flavorant is menthol.

For example, beads of polyvinyl acetate pre-encapsulated menthol can be mixed within a polyvinyl acetate film forming material, then the mixture can be applied to a cigarette as a film. Alternatively, a non-encapsulated liquid menthol can be mixed with a polyvinyl acetate film forming material, then the mixture can be applied to a cigarette as a film.

It is noted that the pre-encapsulated menthol can be pre-encapsulated by other adhesive, flavor-retaining polymeric materials, such as polyvinyl alcohols, poly-acrylates, poly (ethylene) glycols, poly-glycolic acids, pectin, polysaccharides, poly-lactic acid, polyesters, polyethylene oxides, poly epoxides, or the like prior to mixing the pre-encapsulated menthol with the film forming material.

In a preferred embodiment, the polyvinyl acetate film comprises by weight up to 20%, more preferably about 10% to about 15%, of flavorant, such as encapsulated or non-encapsulated menthol, and can be applied on a component of a cigarette. For example, the film can be applied to a surface of a filter, coated on a tobacco mat of a non-traditional cigarette or coated on a paper wrapper of a cigarette. In a preferred embodiment, the film encapsulates menthol and optionally also mint.

Preferably, as mentioned above, the film-type encapsulated flavorant includes an encapsulating polyvinyl acetate film forming material and at least one flavorant. However, additional other materials can optionally be added to improve the film-forming characteristics of the encapsulating polyvinyl acetate film forming material or enhance the polyvinyl acetate film forming material's stability. In an exemplary embodiment, the film has a substantially homogenous composition in which flavorant is substantially uniformly distributed. The film encapsulating material provides a barrier to the release of the flavoring, wherein an effective amount of flavoring is released as desired. For example, a release of at least 0.01 mg/puff is desired from an exemplary traditional cigarette, or a total weight of about 2 wt % of menthol of the total weight of a tobacco rod of a cigarette is desired prior to smoking to allow for release upon smoking.

The film can be applied to one or more components of the cigarette, such as an outer surface of a wrapper around a filter or an outer wrapper of a cigarette, as a liquid coating, which is dried to a film. The dimensions of the dried film are not limited. Preferably, the dried film has a maximum thickness of about 50 µm to about 150 µm, and more preferably up to about 75 µm. The film can be manufactured by any suitable process that produces a film having the desired structure, composition, and dimensions. For example, the film can be applied by a coating process, such as spray coating, a dipping process, electrostatic deposition, printing wheel application, gravure printing, ink jet application, and the like. An emulsion, suspension or slurry comprising the polyvinyl acetate and flavorant, and optional additives is prepared and then applied as a coating to one or more selected surfaces of one or more selected components of the cigarette. The coating is preferably dried to remove water and/or other solvents and form a solid film having desired dimensions. The drying can occur by evaporation or lowering of the temperature of the film in order to solidify and enhance the adherence of the film onto the selected surfaces.

In one embodiment, a film of polyvinyl acetate matrix encapsulated film is formed on an outer surface of a wrapper around a cigarette filter, such as on a plug wrap or within a plug downstream from any sorbents. By providing the film in this location, the film can be exposed to elevated heat and moisture from a smoker's mouth during smoking, as well as from mainstream smoke. As mentioned above, heat and moisture allows the encapsulated film to release at least a portion of the flavorant from the polyvinyl acetate matrix. Thus, by providing the film in a location with elevated moisture and/or temperature levels during use, the flavorant can be retained by entrapment within the polyvinyl acetate matrix during storage and released from the polyvinyl acetate matrix upon use.

Figure 2A:
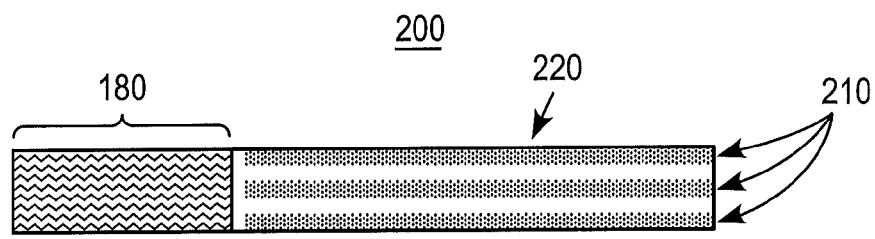
FIGS. 2(a)-(c) illustrate flavor bands according to exemplary embodiments.
Figure 2B:
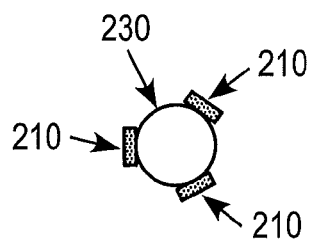
Figure 2C:
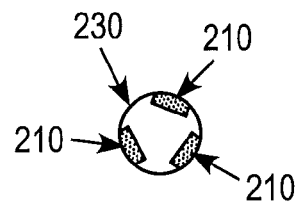
Figure 3:
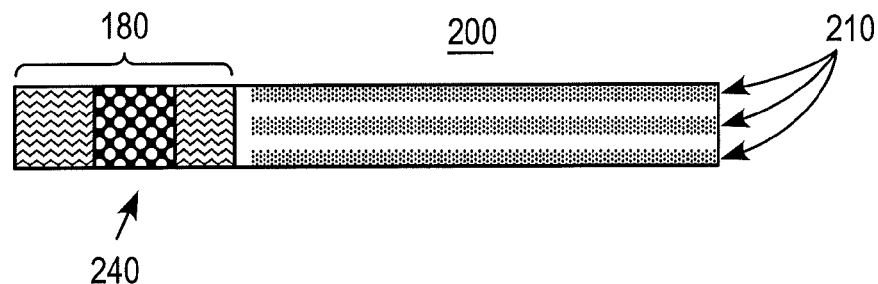
FIG. 3 illustrates flavor bands according to another exemplary embodiment.

In another embodiment, the film can be formed as flavor bands on the outer paper wrapper, where the flavor bands may be coated on an inner or outer side of an outer paper wrapper. Preferably, the number, width and position of flavor bands are arranged in a way such that air can diffuse into a tobacco rod to sustain combustion during static burn, but still provide flavorant to mainstream smoke. For example, as shown in FIG. 2(a), flavor bands 210 may be formed parallel to the burning direction of the tobacco rod 220, thus delivering flavor as a cigarette 200 is smoked. As illustrated in FIGS. 2(b) and 2(c), the flavor bands 210 may be located on the inner side or the outer side of a cigarette paper wrapper 230. The flavor bands 210 may also be used with sorbents 240, as shown in FIG. 3.

The flavor bands may be formed before, during and/or after the formation of the tobacco rods by coating, printing, painting, spreading, extruding, dripping or casting the film on the paper surrounding the tobacco rods. Through using flavor bands, the flavor and any sorbent have reduced interaction thus preserving the properties of each. For example, when flavor bands are placed on cigarettes, high menthol delivery can be provided during smoking of cigarettes with activated carbon. Additionally, when using flavor bands with activated carbon containing cigarettes, the activated carbon, as well as the flavor bands can retain a desired level of their properties even after an extended period of time in proximate relation to one another.

Figure 4:
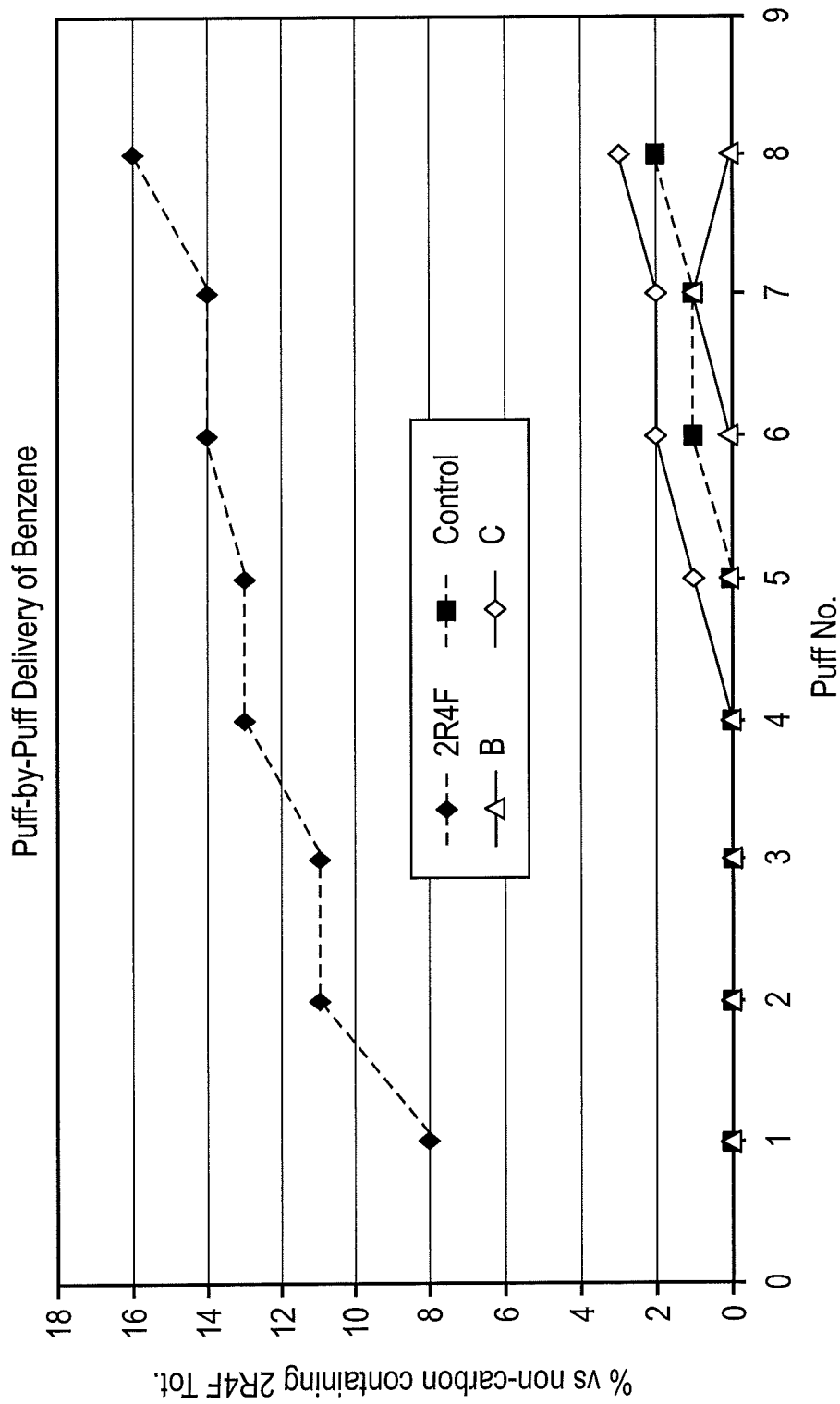
FIG. 4 illustrates a puff-by-puff delivery of benzene in exemplary embodiments.
Figure 5:
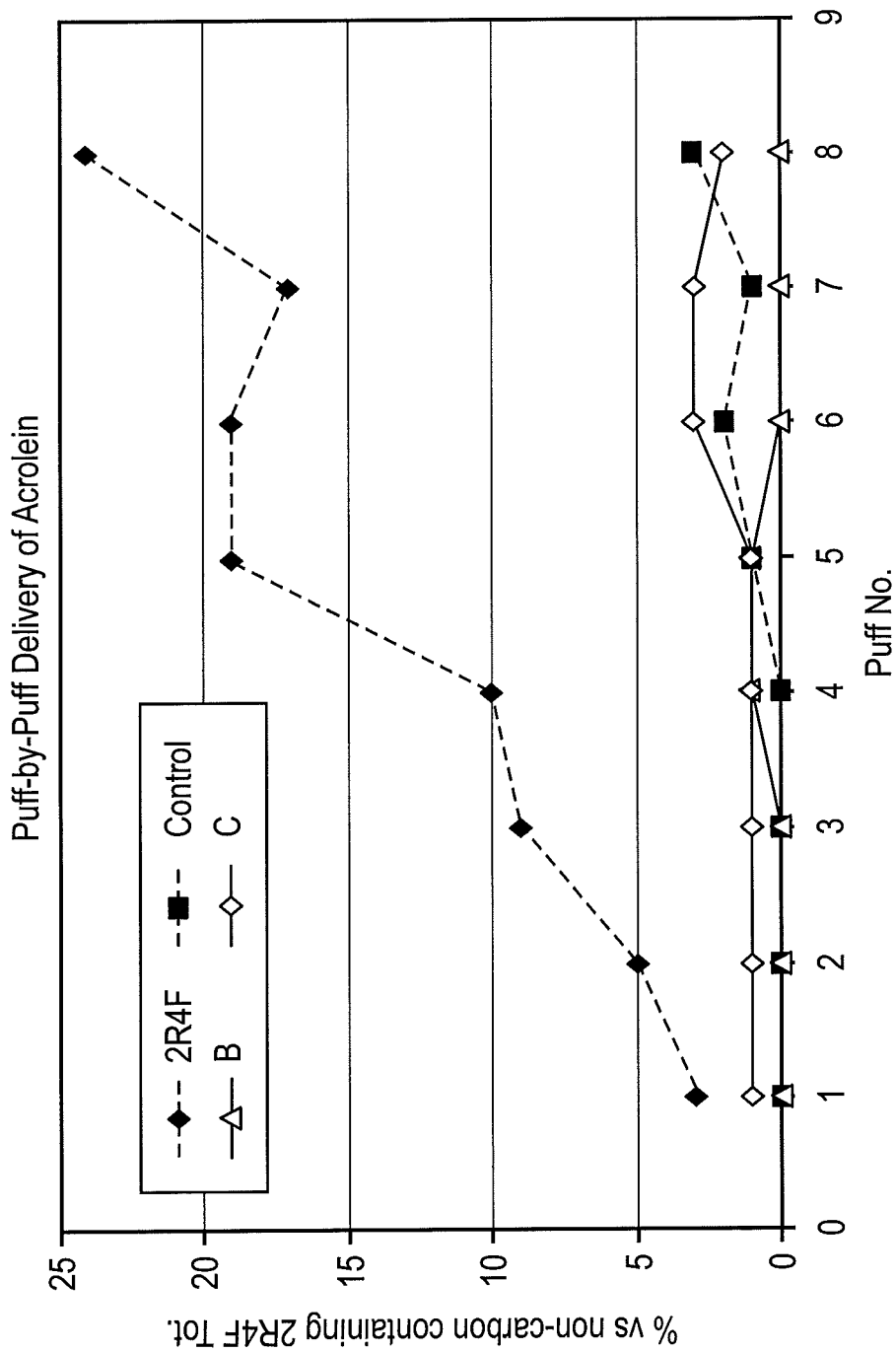
FIG. 5 illustrates a puff-by-puff delivery of acrolein in exemplary embodiments.
Figure 6:
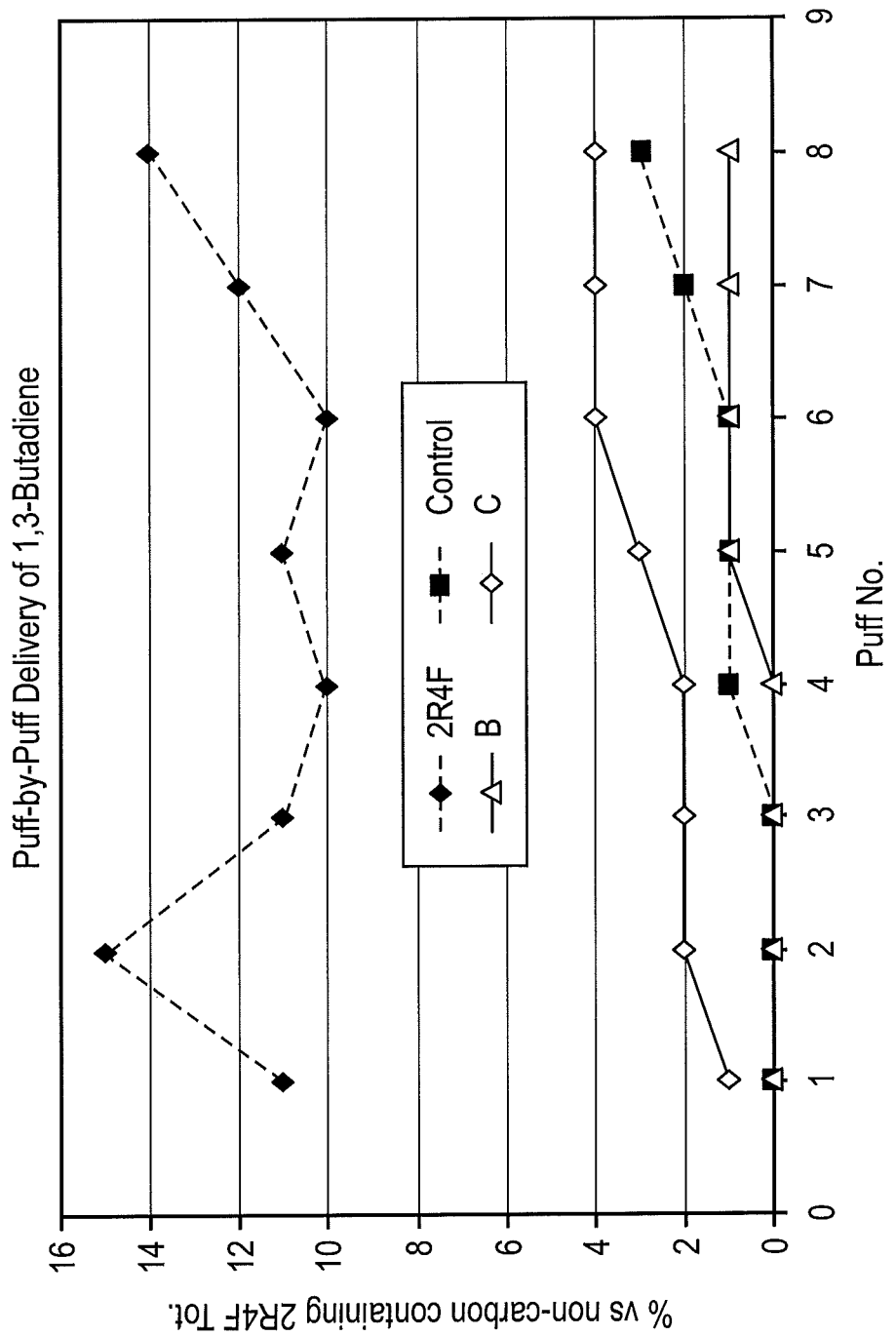
FIG. 6 illustrates a puff-by-puff delivery of 1,3-butadiene in exemplary embodiments.

Carbon does not appear to interact with menthol flavor bands. As illustrated in FIGS. 4-6, menthol flavor banded cigarettes B and C, which are also carbon containing, have similar benzene, acrolein and 1,3-butadiene sorption compared to a non-menthol containing, carbon containing control cigarettes ("control"), which absorb benzene, acrolein and 1,3-butadiene better than the non-carbon containing cigarette 2R4F in a puff-by-puff comparison. As illustrated in FIGS. 4-6, the control cigarette and the flavor band cigarettes both reduce benzene, acrolein and 1,3-butadiene at similar levels. As such, when menthol is provided by the flavor bands, the menthol does not significantly deactivate the sorbent in the cigarette, at least as pertains to benzene, acrolein and 1,3-butadiene reduction.

Preferably, menthol in flavor bands in a cigarette has minimal adverse effects on sorbents in the cigarette and also allows for high levels of menthol to be released during smoking. For example, as illustrated in Table 1, menthol levels such a 0.18 mg/cig, 0.51 mg/cig and 1.36 mg/cig can be placed in flavor bands on an exemplary cigarette having carbon sorbent material in the filter. As a result, 0.021, 0.058 and 0.145 mg/puff of menthol can be delivered during smoking with very little change in the acrolein, 1,3-butadiene, acetaldehyde or benzene levels in fourth puffs of cigarettes with flavor bands (Examples A, B, C) compared to cigarettes without flavor bands (Control). However, it is noted that preferably the flavor bands provide at least about 0.01 mg/puff of menthol flavoring, wherein the level of menthol flavoring per puff depends upon the concentration of menthol within the polyvinyl acetate film forming material, as well as the amount of menthol provided, i.e., the size and number of flavor bands provided.

TABLE 1

| | Examples | | | |
| --- | --- | --- | --- | --- |
| | A | B | C | Control |
| Menthol/Polyvinyl acetate (mg) | 8.5/15 | 19/15 | 38/15 | 0/0 |
| Total Cigarette Data | | | | |
| Menthol (mg/cig) | 0.18 | 0.51 | 1.36 | 0 |
| TPM (mg) | 15.4 | 16.8 | 19.1 | 13.9 |
| Puff Count | 8.5 | 8.8 | 9.4 | 8.0 |
| MS Menthol/Puff (mg/puff) | 0.021 | 0.058 | 0.145 | 0 |
| Puff 4 Data vs 2R4F | | | | |
| Acrolein (%) | 0 | 0 | 0 | 0 |
| 1,3-Butadiene (%) | 0 | 0 | 1 | 0 |
| Acetaldehyde (%) | 4 | 1 | 4 | 0 |
| Benzene (%) | 0 | 0 | 0 | 0 |

No change observed in CO/TPM and NO/TPM ratios

Additionally, the flavor bands can be used as a substitute for or additive in a seam adhesive used on the wrapper. For example, the film may be placed on a seam of a cigarette wrapper to provide adhesion of the seam, as well as flavorant within a cigarette.

In an embodiment mentioned above, encapsulated flavorant can be located at least in a filter portion of a cigarette. In some embodiments, the encapsulated flavorant may be located in the filter of a cigarette. For example, a sorbent and the encapsulated flavorant can be located in a filter portion of the cigarette, wherein the flavorant is downstream from the sorbent.

Various filter constructions may be used to prepare the cigarettes. Exemplary filter structures that can be used for cigarettes include, but are not limited to, a mono filter, a dual filter, a triple filter, a single or multi-cavity filter, a recessed filter or a free-flow filter. Mono filters typically contain cellulose acetate tow or filter paper materials. Dual filters typically comprise a cellulose acetate mouth side and a cellulose acetate plug segment. In such dual filters, the sorbent and encapsulated flavorant are preferably located near the smoking material or tobacco side of a cigarette. The length and pressure drop of the two segments of the dual filter can be adjusted to provide optimal adsorption, while maintaining acceptable draw resistance of the cigarette.

Cigarette triple filters can include mouth and smoking material or tobacco side segments, and a middle segment comprising a filter material or paper. The sorbent and encapsulated flavorant can be provided in the middle segment. Cavity filters typically include two segments, e.g., acetate-acetate, acetate-paper or paper-paper, separated by a cavity. The sorbent is preferably provided in the cavity. Recessed filters include an open cavity on the mouth side, and may incorporate sorbent amongst the plug material. The filters may also optionally be ventilated, and/or comprise additional sorbents, catalysts, flavorants or other additives conventionally used in the cigarette filter art.

Examples

Exemplary flavorants encapsulated by polyvinyl acetate can be formed to predetermined ratios of flavorant to polyvinyl acetate for high flavor releasing capacity. Desirably, stable composites of flavorant and polyvinyl acetate are formed with high levels of flavorant to provide efficient flavor-releasing agents. The following examples of composites of flavorant and polyvinyl acetate provide data regarding flavorant stability in polyvinyl acetate as a function of flavorant concentration.

In preparing the exemplary composites (i.e., encapsulated flavorants), menthol is used for the flavorant and polyvinyl acetate is used to encapsulate the menthol. A process for preparing the encapsulated flavorant includes: 1) adding 75.5 g ethanol (95%) to 12.5 g polyvinyl acetate beads (MW~500,000); 2) stirring the mixture at room temperature for about 2 hours to form a clear solution; 3) adding 7.5, 15.1, 30.1 or 15.1 g of menthol solid to form solutions A, B, C, and D respectively; 4) stirring the solutions A, B, C and D for about 6-12 hours to form clear solutions; 5) reducing the ethanol content of solution D from 75 g to 62.5 g; and 6) forming films, beads, bars and fibers after vaporization of the solvent by casting, molding, extruding, grinding, cutting and/or spinning processes.

The stability of menthol releasing capacity of the formed composites can be tested, where stability is exemplified by the composite retaining most of its weight with minimal flavor loss over time in an open container under ambient conditions. Instability, on the other hand, is exemplified by loss of weight and a menthol smell.

As shown in Table 2, of the A, B and C composites, C has the highest menthol starting concentration, B has the second highest, followed by A with the lowest starting menthol concentration. When the A, B and C composites are made, however, B has higher menthol retention than C or A. It is noted that the starting menthol levels and ending menthol retention levels of Table 2 are compared with respect to the starting sample weight in order to illustrate the effect on menthol retention by the polyvinyl acetate. By calculating the ending menthol retention with respect to the starting sample weight, Composites A-D can be compared for menthol retention with each other, as well as the control sample of pure menthol. Thus, Table 2 illustrates a loss of menthol levels for pure menthol with varying higher levels of retention of menthol in Composites A-D compared to the control pure menthol.

TABLE 2

Menthol Content of Menthol/Polyvinyl Acetate Composites

| Sample | Starting Menthol %/W0 | End. Menthol Retention %/W0 | Menthol %/W1 Expected | Menthol %/W1 Released |
|---|---|---|---|---|
| Composite A | 37 | 38 | 38 | 35 |
| Composite B | 55 | 41 | 46 | 46 |
| Composite C | 71 | <18 | <37 | 23 |
| Composite D | 54 | 48 | 51 | 52 |
| Control (pure menthol) | 100 | <8 | 100 | — |

W0: Starting sample weight; W1: Ending sample weight.
*Unstable samples under ambient conditions with ±2% error due to varying moisture content and calculation error.

Figure 7:
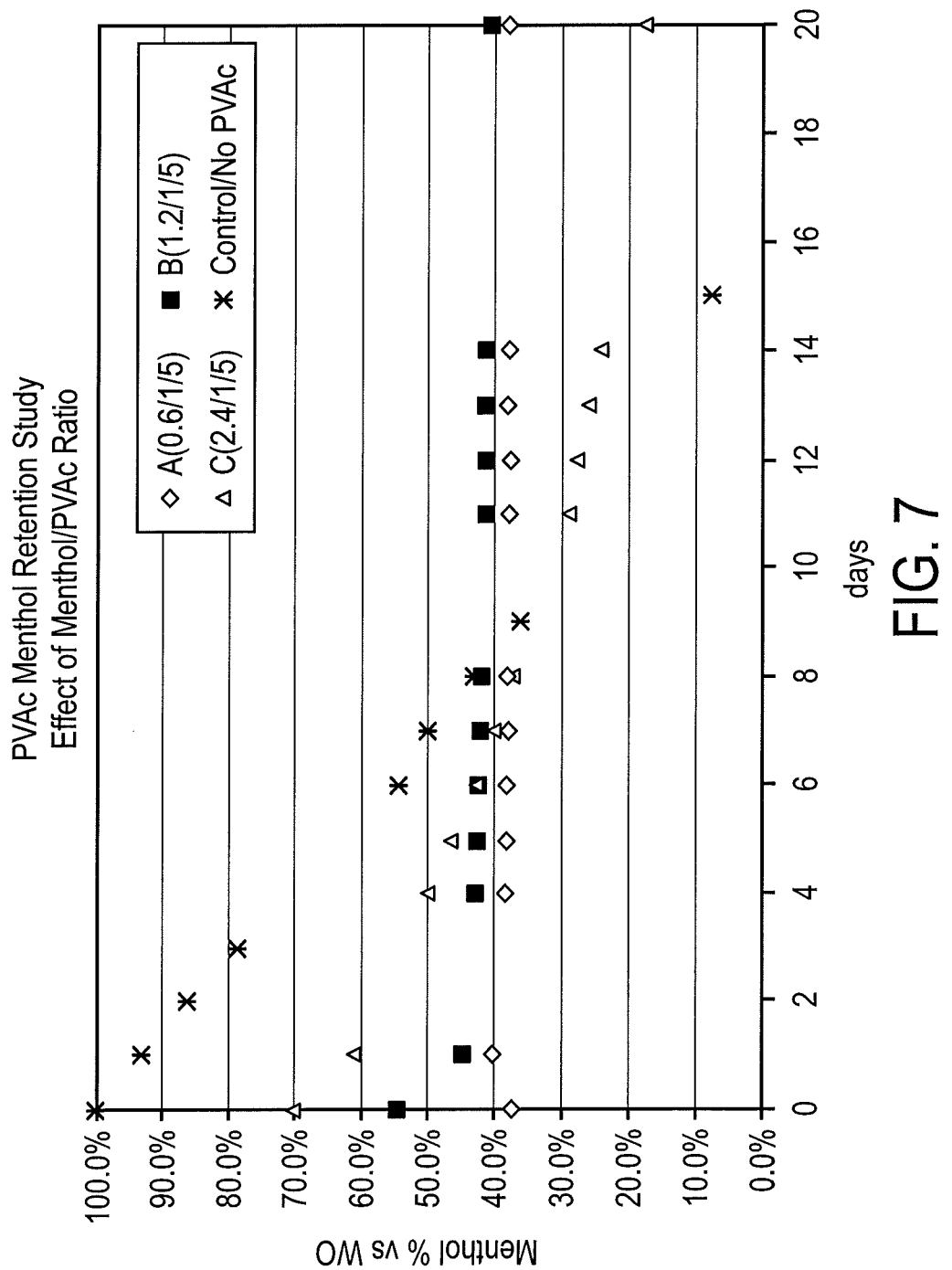
FIG. 7 illustrates menthol retention of exemplary embodiments when the menthol to polyvinyl acetate ratio is varied.

This is further illustrated in FIG. 7 which compares menthol retention over time for Composites A, B and C, as well as pure menthol (control), where A and B have similar menthol retention after 20 days and C and pure menthol have lower menthol retentions. The menthol retention results of FIG. 7 appear to illustrate that C is not stabilized in the polyvinyl acetate, perhaps due to its higher starting menthol level, wherein Composite C behaves similarly to the pure menthol in its retention level over time.

Figure 8:
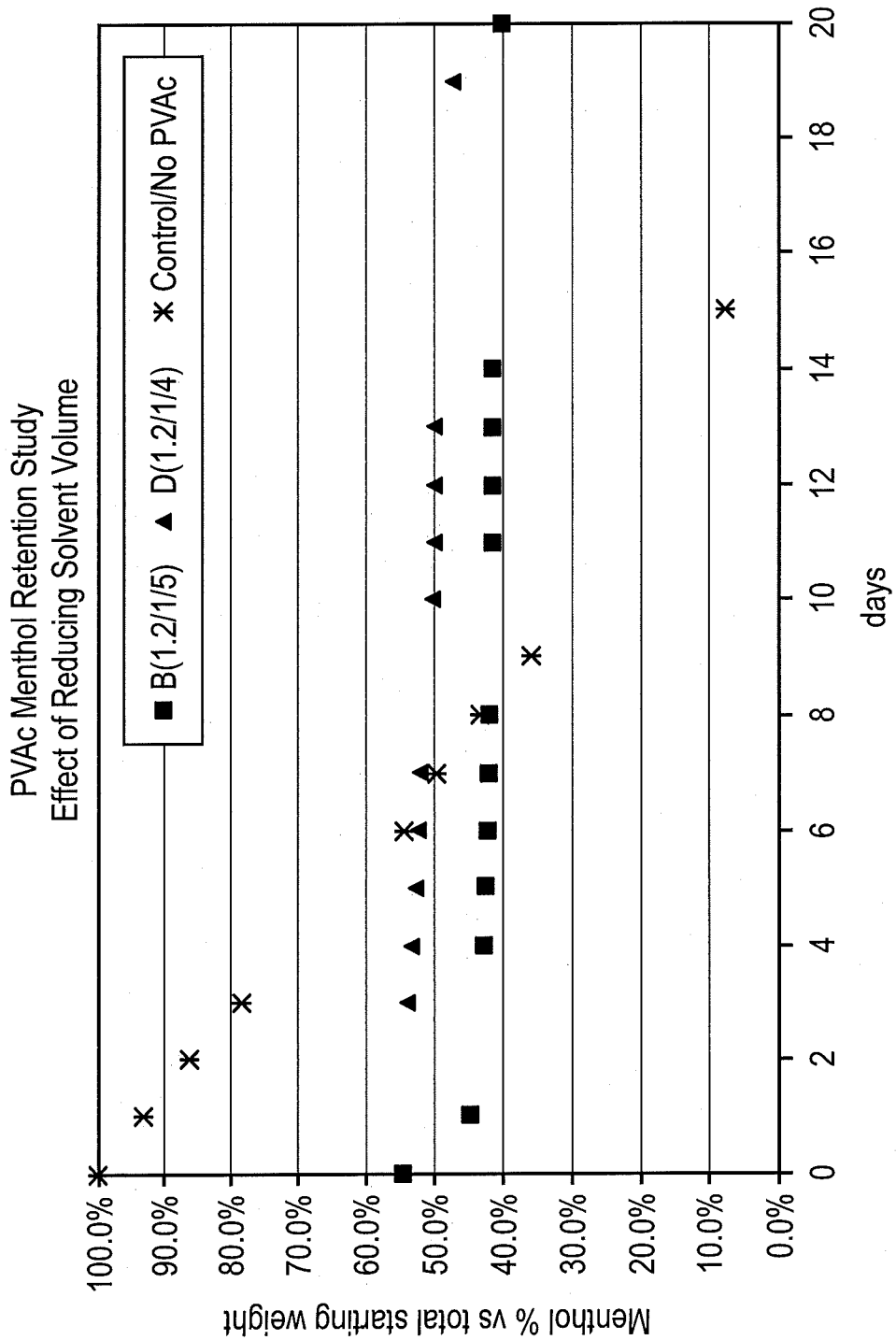
FIG. 8 illustrates menthol retention of exemplary embodiments when the solvent volume is varied.

As illustrated in FIG. 8, the reduction of ethanol levels from B to D appears to allow for an increase in the menthol retention over time. In contrast, the Control Sample (pure menthol without polyvinyl acetate) has much less menthol retention over time than either B or D, as also illustrated in FIG. 7.

Figure 9:
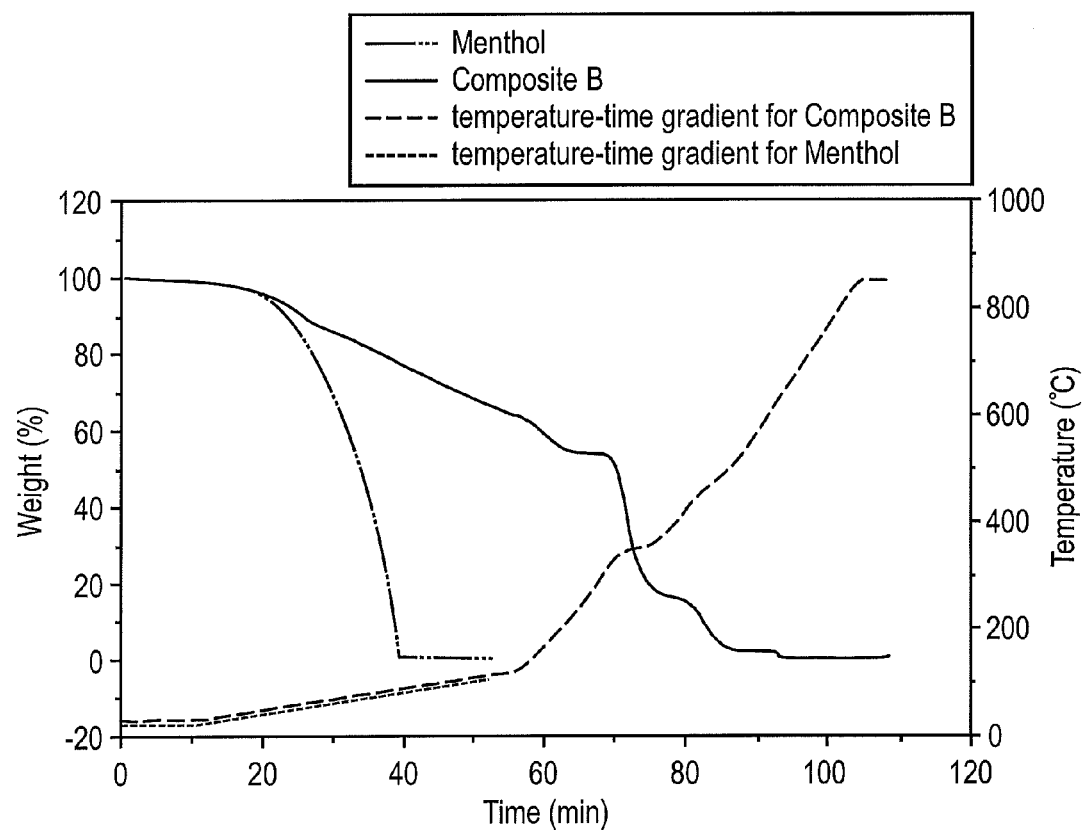
FIG. 9 illustrates results from ThermoGravimetric Analyzer (TGA) tests of a polyvinyl acetate-menthol film compared to pure menthol showing retention of menthol compared to weight loss of the film.

The menthol releasing capacity can also be measured in weight % over time to determine encapsulated flavorant properties. As illustrated in FIG. 9, an encapsulated menthol (Composite B) is compared with pure menthol (not encapsulated), where they are each subjected to increasing temperatures over time (as shown by the temperature line from the lower-left to the upper-right of FIG. 9 with the temperature on the right axis). As illustrated in FIG. 9, using ThermoGravimetric Analysis (TGA), Composite B and the not encapsulated pure menthol appear to maintain similar menthol retention at temperatures below about 50° C. (as shown in the upper-left portion of FIG. 9), but at temperatures above about 50° C., Composite B maintains its weight better than the pure menthol. As also illustrated in FIG. 9, the pure menthol is at about 0 wt % at below 100° C., while Composite B stays above 0 wt % until around 600° C. Also, Composite B has over 50 wt % reduction at temperatures exceeding 300° C., where Composite B has about an 80 wt % (from 90 wt % to 10 wt %) reduction in weight from about 100° C. to about 500° C. and shows a gradual release of menthol (steady reduction in weight %) for a temperature range of about 50° C. to about 200° C. Thus, by encapsulating the menthol in Composite B, release over a larger and higher temperature range can be achieved.

Figure 10:
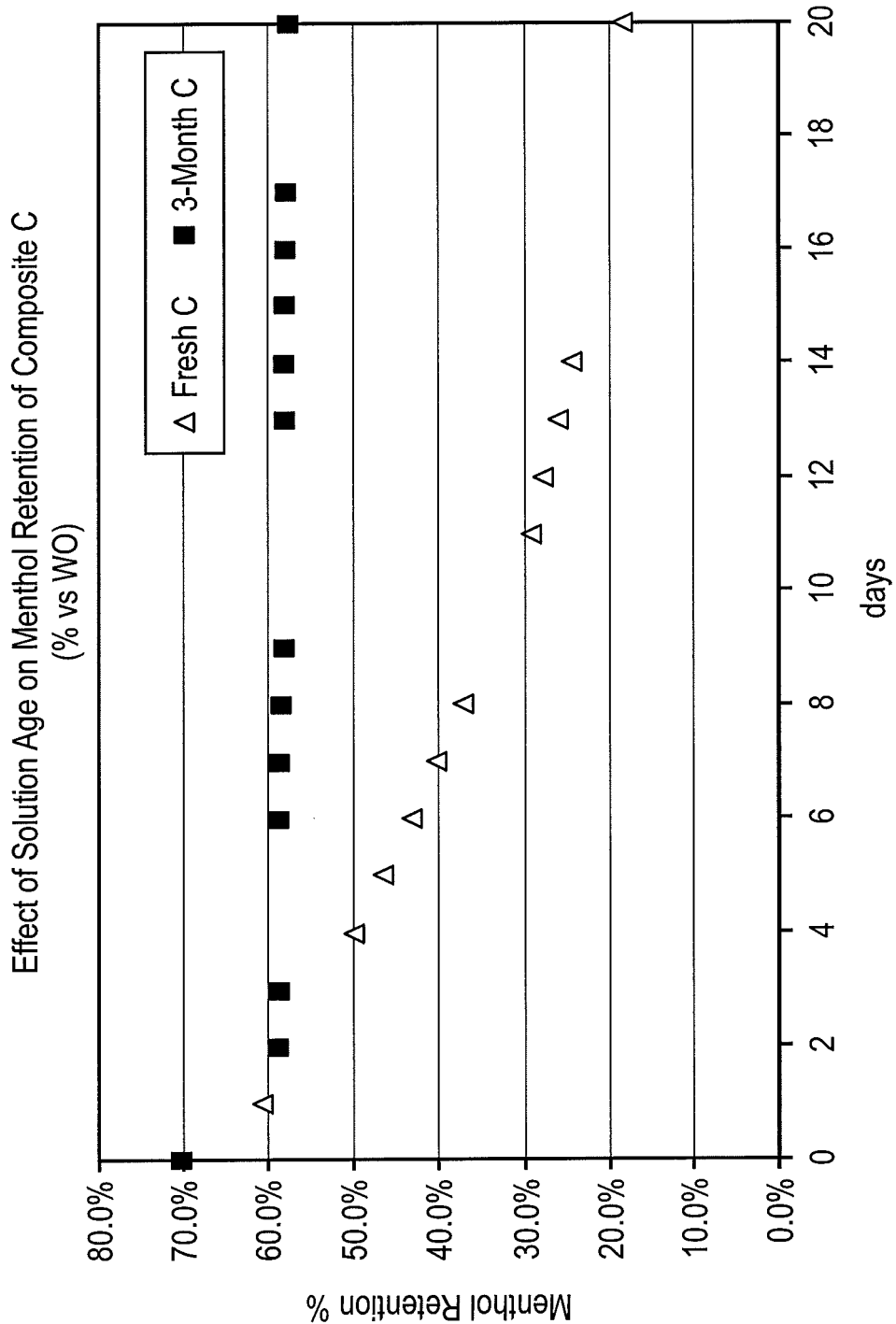
FIG. 10 illustrates menthol retention based on aging of a solution.

Additionally in another example, samples of the Composite C can be aged for about three months to determine any changes in stability that aging may cause. As shown below and as illustrated in FIG. 10, the aged Composite C has improved menthol retention compared with "fresh" Composite C, especially for retention over 4 days.

Therefore, menthol can be mixed with polyvinyl acetate at high levels and can maintain these high menthol levels if aging is used and/or solvent is reduced in the composite of menthol and polyvinyl acetate.

Variations and modifications of the foregoing will be apparent to those skilled in the art. Such variations and modifications are to be considered within the purview and scope of the claims appended hereto.

What is claimed is:

1. A cigarette comprising tobacco, a filter, sorbent, and an encapsulated flavorant comprising a triacetin-free polyvinyl acetate matrix with flavorant bound within the matrix wherein the flavorant comprises menthol substantially uniformly distributed throughout the matrix.

2. The cigarette of claim 1, wherein the encapsulated flavorant:
   (b) is located on an outer surface of the filter of the cigarette and the sorbent is located in a cavity in the filter;
   (c) is located in a central region of a tobacco rod of the cigarette or is distributed throughout a tobacco rod of the cigarette;
   (d) comprises a flavor band located on a paper wrapper surrounding a tobacco rod of the cigarette;
   (e) comprises a flavor band located on a paper wrapper surrounding a tobacco rod of the cigarette and is located on a seam of the paper wrapper and provides adhesion of the seam;
   (f) is temperature sensitive, wherein temperatures greater than 100° C. release flavorant into the cigarette, wherein at temperatures below 100° C., a majority of the encapsulated flavorant remains encapsulated;
   (g) is within the filter and the filter is a mono filter, a dual filter, a triple filter, a mono or multi-cavity filter, a recessed filter or a free-flow filter; and/or
   (h) is in the form of a fiber, film, monolith, bead, powder or granule.

3. The cigarette of claim 1, wherein the sorbent reduces benzene, acrolein and/or 1, 3-butadiene levels for each puff when the cigarette is smoked.

4. The cigarette of claim 1, wherein the sorbent comprises activated carbon, molecular sieves, zeolites, or combinations thereof in a passageway of a tubular free-flow filter component, a material of a free-flow filter component and/or in a void space of the filter.

5. The cigarette of claim 1, wherein the cigarette is a non-traditional cigarette adapted to be smoked in an electrically heated cigarette smoking system.

6. The cigarette of claim 2, wherein the flavor bands are on an inner or an outer surface of the paper wrapper.

7. The cigarette of claim 2, wherein a portion of the menthol flavorant is released from the triacetin-free polyvinyl acetate matrix when a portion of the cigarette is at temperatures between 300° C. and 800° C.

8. The cigarette of claim 1, wherein the menthol flavorant is present in an amount of about 1-90%, 2-70% or 10-50% by weight based on 100 parts by weight of the triacetin-free polyvinyl acetate matrix.

* * * * *